United States Patent Office 3,011,457
Patented Dec. 5, 1961

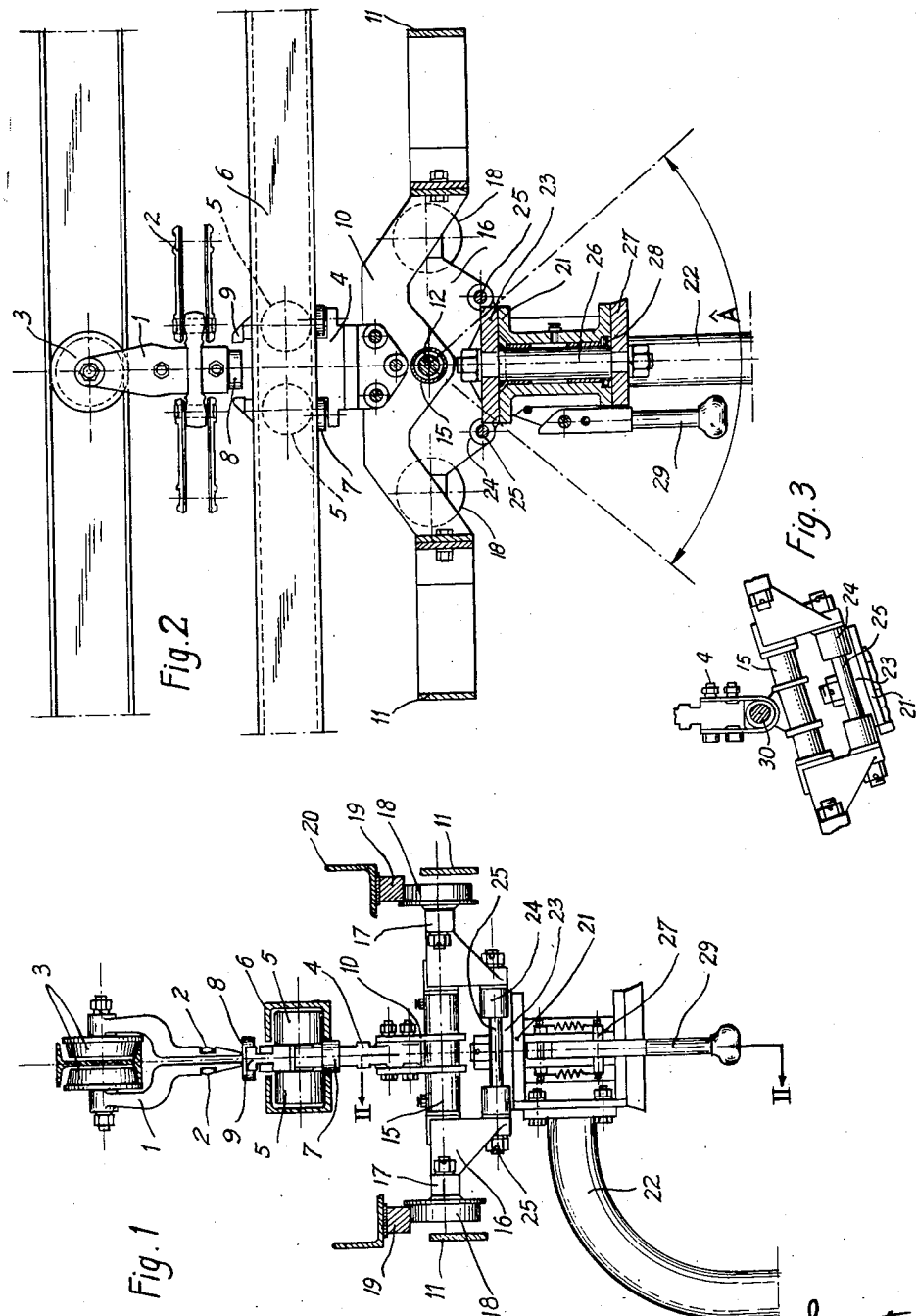

3,011,457
OVERHEAD CONVEYORS
Lucien Péras, Billancourt, France, assignor to Regie Nationale des Usines Renault, Billancourt, France, French works under control of the French Government
Filed Jan. 27, 1958, Ser. No. 711,269
4 Claims. (Cl. 104—172)

The present invention relates in general to overhead conveyors and has specific reference to improvements in overhead conveyors which are adapted to stabilize both vertically and laterally the load carrier suspended from a trolley conveyor or a carriage running along an overhead track, this stabilizing action occurring for example at predetermined locations or stations along said overhead track.

As a rule, in overhead conveyors of the types utilized for transporting or delivering loads or supports in view of performing assembling operations, these loads or supports are suspended freely from carrier trolleys attached to and driven by an endless power driven chain or cable of the conveyor system.

This suspension is effected through swivel or pivot pins, or like hinge means, whereby the load or support—which is called hereafter "load carrier" to simplify the disclosure—can perform pendular oscillatory movements. In fact, pendular movements about a horizontal axis perpendicular to the conveyor main axis are necessary along track sections of short radius and inclined track sections connecting different floors or levels, in order to enable the centre of gravity of the load and of its support to be constantly coincident with the vertical passing through the point where the trolley engages the conveyor track, thereby preventing the load from exerting abnormal stress on the carrier and conveyor parts. On the other hand, when manual or automatic assembling operations must be carried out on the work carried by an overhead conveyor, this free oscillation of the load carriers is most likely to interfere with the work to be accomplished on the parts or sub-assemblies transported by the load carriers. Under these conditions some means must be provided along the working sections of the conveyor to prevent any pendular oscillatory movement from taking place or, in other words, stabilizing the carriers vertically, while permitting on the other hand their rotation about a vertical axis to a predetermined number of positions in which the carriers can be locked for example by means of detent positioning devices. Besides, this stabilizing action is also necessary outside the working zones, for example, when the oscillation of the load carriers may either be detrimental to the parts or materials transported thereby, or constitutes a danger for the personnel, and also whenever the plant disposition makes this stabilizing action necessary for safety or other reasons.

With this end in view, it is the essential object of the present invention to provide a stabilizing device for completing the suspension of load carriers on the trolleys of an overhead conveyor. This device consists essentially of a set of guide rollers or skids adapted to engage auxiliary tracks or rails disposed along predetermined sections of, and parallel to, the main conveyor track. These auxiliary rails are disposed on either side of the main track above the load carrier stabilizing device and the rollers or skids thereof so as to act as separate tracks and guide means therefor.

By disposing these auxiliary rails only in the straight conveyor sections and in the curved sections of relatively large radius, the load carriers may be allowed to oscillate freely, particularly in up and down grades, and whenever this oscillation is deemed necessary or advantageous.

Finally, by providing two guide rails disposed at different heights on either side of the conveyor a great stability may be combined with a suitable lateral inclination of the load carriers relative to the direction of movement of the conveyor trolley, and, in this case, the load carrier suspension device comprises a pivot pin parallel to the conveyor track and located between the conveyor trolley and the axis of longitudinal oscillation of the load carrier.

In order to afford a clearer understanding of the present invention and of the manner in which the same may be carried out in the practice, reference will now be made to the accompanying drawing illustrating diagrammatically by way of example typical embodiments of an overhead track conveyor constructed in accordance with the characteristic features of the invention. In the drawing:

FIGURE 1 is an elevational, part-sectional view of a trolley and load-carrier assembly as seen in the direction of movement thereof;

FIGURE 2 is a lateral and sectional view of the assembly illustrated in FIGURE 1, the section being taken across the lower portion thereof as indicated by the line II—II of FIG. 1; and, FIGURE 3 is an elevational view of a modified form of trolley and load-carrier assembly as seen in direction of movement thereof.

The driving device consists of a conventional-type trolley 1 having its body connected to the links 2 of a driving chain and formed with a forked upper portion equipped with a pair of wheels 3 running on the lower flanges of a single I-beam constituting the overhead track of the conveyor.

The carriage 4 of the suspension device comprises on the one hand four vertical rollers 5 running in a track consisting of a pair of registering channel sections 6 having their concavities turned toward each other, and on the other hand a pair of horizontal rollers 7 adapted to centre the carriage between the lower flanges of the sections 6.

The carriage 4 is driven by the trolley 1 engaging with its lower projecting block 8 either of a pair of catches 9 rigid with the carriage.

The carriage body has bolted thereon a pair of longitudinally extending side plates 10 having substantially the shape of flattened inverted W's. On these side plates 10 are bolted in turn bumpers 11 adapted to keep a suitable spacing between adjacent loads with due consideration for their over-all dimensions and the longitudinal movements of the load carriers, mainly when the driving chain is starting from rest and stopping. In order more clearly to illustrate the arrangement of the stabilizing device the outer extensions of plates 10 and the bumpers 11 are not shown in FIG. 1.

According to this invention, the stabilizing device is preferably mounted level with the parts 10, 11 and comprises a cradle consisting on the one hand of a transverse shaft 12 extending through the lateral plates 10 and fitted in a sleeve 15, and on the other hand of two brackets 16 mounted in any adequate manner on the ends of shaft 12 and adapted to receive guide rollers or skids. These members 16 consist preferably of castings formed with hubs 17 receiving the trunnions of stub shafts of rollers 18; in this embodiment, each bracket 16 carries a pair of rollers 18 disposed longitudinally on either side of the pivot shaft 12 of the cradle. These rollers 18 engage overlying rails 19 constituting an auxiliary stabilizing track secured on the under face of the horizontal flange of supporting angle irons 20; these angle irons 20 are mounted in any suitable manner (not shown) on the driving chain conveyor frame structure.

The other component elements of the load carrier may be constructed according to the known arrangements.

An intermediate member is secured on the brackets 16 and acts as a vertical pivot member to a sleeve 21 carrying one or more supporting arms 22 of a design consistent with the loads to be transported.

This intermediate member comprises an upper plate 23 provided with hubs 24 through which extend a pair of pins 25 bolted on the brackets 16. This upper plate 23 acts as a supporting member to the vertical pivot pin 26 welded and bolted to the plate 23, and retaining with its lower end a relatively fixed base plate 27 engaged by a thrust bearing 28 supporting the movable sleeve 21. A spring-loaded handle 29 is provided whereby the sleeve 21 and consequently the load supporting arm 22 may be locked relative to the base plate 27 in any desired angular direction about the axis of the vertical pivot pin 26 for facilitating the work at the different stations served by the conveyor.

The mode of operation of the stabilizing device described hereinabove and illustrated in the accompanying drawing is extremely simple. The load carrier comprising the cradle and the pivotally mounted supporting arm may oscillate freely in the longitudinal direction about the transverse shaft 12 for the reasons set forth hereabove, with an angular amplitude limited by construction to the angle A in the case illustrated. As the carrier reaches a working station along the conveyor trackage the rollers 18 engage the rails 19 and the relative spacing of these rollers in both longitudinal and transverse directions is effective to stabilize the carrier vertically by virtue of the bearing points constituted by the rail-engaging rollers. These rails may also comprise a raised inlet portion to facilitate the proper engagement of the rollers therewith. Other guide rails may also be provided in small-radius curved track portions to reduce the effect of the centrifugal force on the assembly as well as any load carrier oscillation likely to cause in these track sections a dangerous or otherwise detrimental sway of the load outside the vertical plane of the conveyor.

The device as illustrated in the drawing by way of example provides only a vertical stabilization of the load carrier.

However, if desired the load carriers can also be stabilized for example at the working stations to permit a lateral inclination of the carriers, without necessitating any substantial modifications of the structure shown. As shown in FIGURE 3, the carriage 4 of the suspension device will support the carrier with the aid of a longitudinal articulated shaft 30 parallel to the path of the conveyor and allowing the carrier the possibility of taking a transverse inclination, in addition to longitudinal oscillation as previously provided, about the oscillation axis surrounded by sleeve 15, this shaft also serving to support an identical cradle provided with stabilizing rollers 18 on which is suspended the supporting arm 22.

Moreover, at the point where such stabilization is desired, the rails 19 will be placed at different levels in accordance with the desired inclination of the carrier. The lowermost rail will have from the beginning a profile that is raised to the level necessary for engagement with the corresponding guide rails of the suspension system. Thus, the desired result can be obtained by simply providing the rails 19 at these locations and at different heights according to the desired inclination. The lower rail comprises a raised inlet portion up to the level where the carrier rollers engage the rail. This raised portion consists of a lowering ramp of which the roller-engaged face has a progressive lateral inclination attaining, at its junction with the rail proper, the lateral inclination of this rail, which is equivalent to the inclination of the load carrier to the vertical that is required to ensure a proper engagement of the rollers.

A similar ramp is provided at the other end of the rail to prevent the load carriers from oscillating laterally as they leave the rails to resume their normal running position.

The vertical stabilizing device is utilized to advantage in small radius track sections of the overhead conveyor, whenever it is desired to prevent the loads from being thrown to the outside directly by the centrifugal force.

Of course, many modifications and alterations as to the arrangement, size and relative proportions of the parts may be brought to the embodiment shown and described herein by way of example, without departing from the spirit and scope of the invention as set forth in the appended claims.

I claim:

1. In an overhead conveyor system, a frame structure, a traveling trolley, a track means carried by the frame structure, a carriage disposed below the trolley and traveling on the track means and driven by the trolley, a load carrier means suspended from the carriage, means mounting the load carrier on the carriage for oscillating movement in a longitudinal direction relative to the carriage and the path of movement of the trolley and the carriage, a transverse cradle mounted on the carriage and located on the axis of oscillation, said cradle and the load carrier means being relatively immovable, said cradle having opposing ends disposed on opposite sides of the axis of oscillation in the longitudinal direction, guide members carried by said ends and a pair of rails disposed parallel to the track means and carried by the frame structure, said rails having flat undersides engaged by the guide members.

2. In an overhead conveyor system, a frame structure, a traveling trolley, a track means carried by the frame structure, a carriage disposed below the trolley and traveling on the track means and driven by the trolley, a load carrier means suspended from the carriage, means mounting the load carrier on the carriage for oscillating movement in a longitudinal direction relative to the carriage and the path of movement of the trolley and the carriage, a transverse cradle mounted on the carriage and located on the axis of oscillation, said cradle and the load carrier means being relatively immovable, said cradle having opposing ends disposed on opposite sides of the axis of oscillation in the longitudinal direction, guide members carried by said ends and a pair of rails disposed parallel to the track means and carried by the frame structure, said rails having flat undersides engaged by the guide members, said rails being disposed at the normal running level of the cradle guide member in order to exert a vertical stabilizing action on the load carrier means.

3. In an overhead conveyor system, a frame structure, a traveling trolley, a track means carried by the frame structure, a carriage disposed below the trolley and traveling on the track means and driven by the trolley, a load carrier means suspended from the carriage, means mounting the load carrier on the carriage for oscillating movement in a longitudinal direction relative to the carriage and the path of movement of the trolley and the carriage, a transverse cradle mounted on the carriage and located on the axis of oscillation, said cradle and the load carrier means being relatively immovable, said cradle having opposing ends disposed on opposite sides of the axis of oscillation in the longitudinal direction, guide members carried by said ends and a pair of rails disposed parallel to the track means and carried by the frame structure, said rails having flat undersides engaged by the guide members, said guide rails being disposed at levels other than the normal running level of the guide members coacting therewith so as to ensure an inclined stabilization of the load carrier means laterally to its direction of travel and a pivot member disposed parallel to the track means and connecting the load carrier mounting means to the carriage.

4. In an overhead conveyor system, a frame structure, a traveling trolley, a track means carried by the frame structure, a carriage disposed below the trolley and traveling on the track means and driven by the trolley, a load carrier means suspended from the carriage, means mounting the load carrier on the carriage for oscillating movement in a longitudinal direction relative to the carriage and the path of movement of the trolley and the carriage, a transverse cradle mounted on the carriage and located on the axis of oscillation, said cradle and the load carrier means being relatively immovable, said cradle having opposing ends disposed on opposite sides of the axis of oscillation in the longitudinal direction, guide members carried by said ends and a pair of rails disposed parallel to the track means and carried by the frame structure, said rails having flat undersides engaged by the guide members, said guide members including vertically disposed guide rollers located at the level of the axis of oscillation and the guide rollers traveling on the undersides of the rails and pivot means disposed parallel to the track means and pivotally connecting the load carrier mounting means to the carriage for transverse swinging movement.

References Cited in the file of this patent

UNITED STATES PATENTS

| | | |
|---|---|---|
| 452,791 | Jackman | May 26, 1891 |
| 640,050 | Von Thal et al. | Dec. 26, 1899 |
| 1,443,382 | Rapier | Jan. 30, 1923 |
| 1,944,100 | Medor | Jan. 16, 1934 |
| 2,274,016 | Verplanck | Feb. 24, 1942 |
| 2,336,551 | Kumler | Dec. 14, 1943 |
| 2,485,215 | Rose | Oct. 18, 1949 |
| 2,796,973 | Mullen et al. | June 25, 1957 |

FOREIGN PATENTS

| | | |
|---|---|---|
| 430,189 | Great Britain | June 14, 1935 |